Dec. 18, 1962        W. H. MORGAN        3,068,692
METEOROLOGICAL TELEMETERING

Filed April 13, 1960        3 Sheets-Sheet 1

Dec. 18, 1962 W. H. MORGAN 3,068,692
METEOROLOGICAL TELEMETERING
Filed April 13, 1960 3 Sheets-Sheet 2

Dec. 18, 1962   W. H. MORGAN   3,068,692
METEOROLOGICAL TELEMETERING
Filed April 13, 1960   3 Sheets-Sheet 3

WIND DIRECTION 6°
SINE = .104
COSINE = .994

WIND DIRECTION 45°
SINE = .707
COSINE = .707

United States Patent Office 3,068,692
Patented Dec. 18, 1962

3,068,692
METEOROLOGICAL TELEMETERING
William H. Morgan, Glendale, Calif., assignor to The Bendix Corporation, a corporation of Delaware
Filed Apr. 13, 1960, Ser. No. 21,924
13 Claims. (Cl. 73—189)

This invention relates to vector resolvers, and more particularly to wind direction and velocity resolvers for meteorolgical telemetering.

The measurement of wind direction by a wind vane and velocity by an anemometer, and the transmission of this data in analog form by such systems as electrical servos for display at central locations, is well known in the art. Recently the advantages of transmission of the same data coded in digital form have been recognized. Foremost is the increased resolution and accuracy in transmission obtainable with digital coded information.

Both of the quantities (wind direction and velocity) measured by the vane and anemometer are analog in nature and together constitute a vector quantity which may be resolved into components along selected axes. It is highly advantageous to convert the information at the metering station from analog to digital form and then transmit it to the central recording station over a digital transmission system. It is further advantageous to resolve the vector quantity into "X" and "Y" components prior to transmission.

In one typical prior art system, the anemometer drives a D.C. generator, the output voltage of which is a direct function of the wind speed. That voltage is applied to the wiper arms of a pair of sine-cosine potentiometers controlled by the vane. The sine-cosine potentiometers are employed to vary the distribution of the voltage generated by the anemometer to an array of four voltage controlled oscillators. The output of the four oscillators is transmitted to a central location, sampled, demodulated and recorded. The utility of such a system is limited by the large number of electrical and electromechanical components required for its successful operation, in particular, the multiple oscillators, sine-cosine potentiometers, and D.C. generators which are required.

With this state of the prior art in mind, the object of this invention is to provide simplified wind direction and velocity resolvers for data recording and telemetering systems.

Another object of this invention is to provide a simple integral electro-optical system for an anemometer and wind vane assembly for generating directly "X" and "Y" component binary coded information based upon the wind vector information detected by the anemometer and vane.

These objects are achieved in accordance with this invention, one specific embodiment of which comprises a first disk coupled for rotation with the wind vane having a shaped window of width varying in accordance with a selected mathematical relationship and a second disk mechanically coupled to the anemometer to rotate at a speed representative of the wind velocity. The second disk includes a series of openings arranged in one quadrant of the disk in a spiral extending from the outer edge region toward the axis. Four light sources are positioned on one side of the first disk, and four photocells are positioned on the opposite side of the second disk in alignment with the light sources.

With this arrangement, the two disks are free to rotate under the control of their moving elements and interrupt light reaching the four photocells, as determined by the orientation of the first disk and the speed of the second disk. With proper positioning and dimensioning of the apertures in the first and second disks, one or two only of the photocells will be energized for any given wind direction, and the energized photocells will receive pulses of light. The total number of pulses is a function of the wind velocity, and the distribution of pulses between the one or two energized photocells is a function of the wind direction. The four photocells are all connected through appropriate time-controlled gates to decade counters, so that the "X" and "Y" components of wind speed and direction are recorded or stored for transmission to a central recording station.

One feature of this invention is the combination of a first disk having a continuous contoured window providing angular information, a second disk having discrete openings producing velocity information and a photoelectric system responding to light pulses transmitted through the disks in sequence whereby the output of the photoelective system is a function of both velocity and angular information.

Another feature of this invention resides in the arrangement of four photoresponsive elements in quadrature to receive pulses from as many light sources, the number of pulses received by the different photoresponsive elements being a function of the velocity components in each of the four directions.

Still another feature is the contouring of the window in the first disk in accordance with a cosine function in one quadrant and a sine function in an adjacent quadrant in order to provide an unambiguous angular indication.

A full understanding of this invention may be had from the following detailed description with reference to the drawing, in which.

Figure 1:
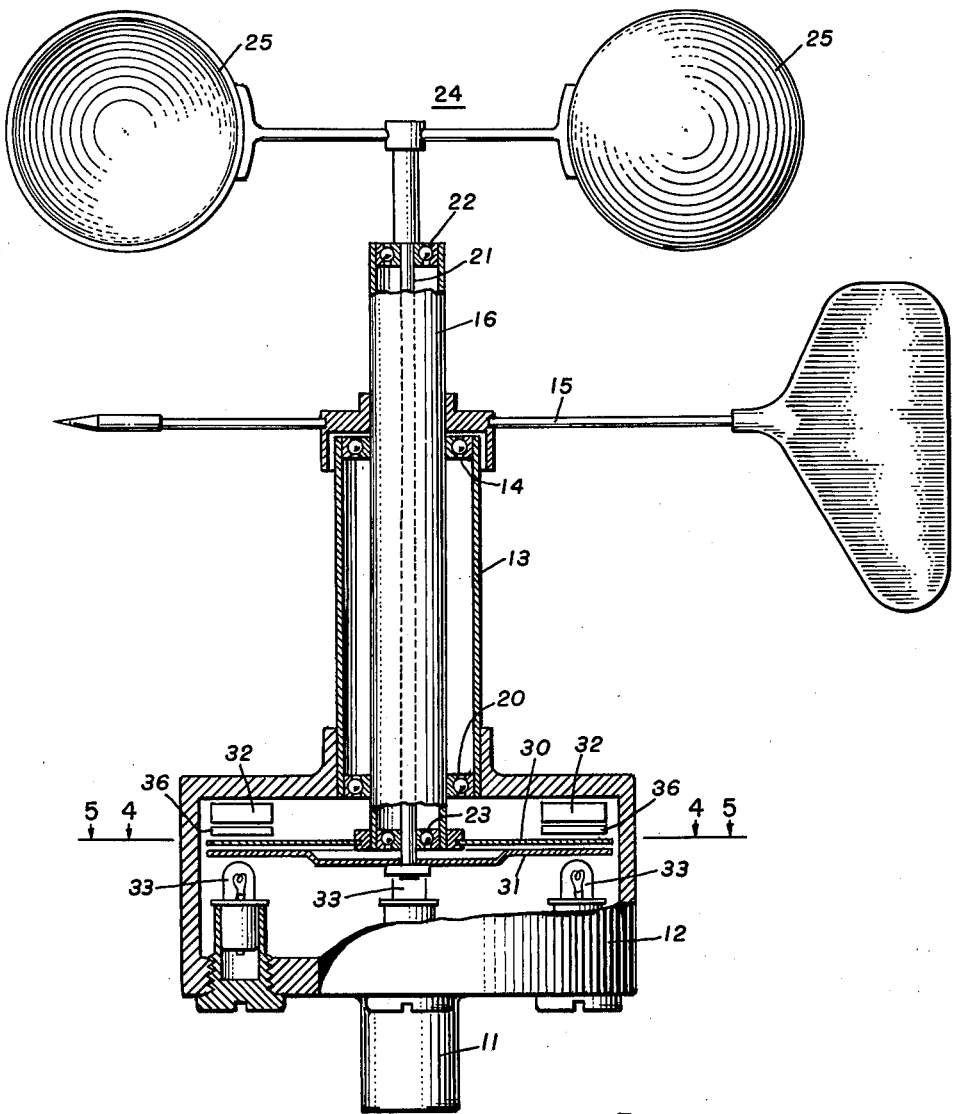
FIG. 1 is an elevational view, partly in section, of a combined anemometer and wind vane employing the vector-resolving and coding apparatus of this invention.

Referring now to FIG. 1, a mounting element 11 supports a housing 12 in which the resolving apparatus of the invention is located. The housing supports a vertical tube 13 with internal ball bearing assemblies 14 and 20 for a rotatable tube 16 carrying a wind vane or pointer 15. Contained within the tube 16 is a shaft 21 similarly mounted for rotation by a pair of ball bearing assemblies 22 and 23. The shaft 21 carries an anemometer cup assembly 24 having three cups 25, two of which are shown in the drawing. Secured to the bottom of tube 16 is a disk or screen 30 having a window 40 that may be seen in FIG. 2. The disk 30 rotates with tube 16 which in turn rotates with vane 15. A second disk or screen 31 is secured to the lower end of shaft 21 to rotate with the anemometer 24.

Within the housing 12 above, the disks 30 and 31 are four photoresponsive elements 32, e.g., photocells, two of which appear in FIG. 1. On the opposite side of the disks 30, 31, are four light sources 33 positioned for transmission of light through the disks 30 and 31 to the photocells 32. The photocells 32 and light sources 33 are positioned within the generally circular housing 12 in quadrature, preferably at the north, south, east and west points of the compass. With the arrangement shown in FIG. 1, light from one or more of the light sources 33 passing through aligned apertures in the disks 30, 31, will energize the mating photocell 32.

Figure 2:
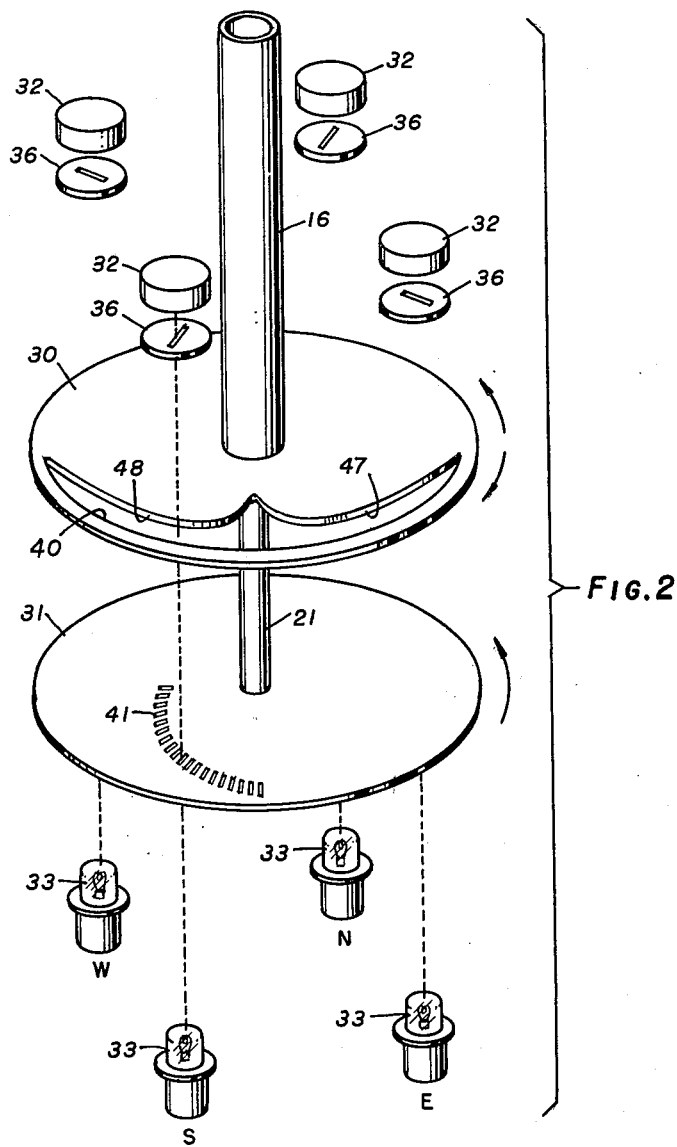
FIG. 2 is a simplified exploded view of a portion of the apparatus of FIG. 1.

Referring now to FIG. 2, the disk 30 has a contoured window 40 bounded at its outer edge by a continuous curve of uniform radius about the axis of tube 16 and bounded at its inner edge by two sections 47 and 48 having continuous curves in accordance with a mathematical relationship hereinafter developed. The disk 31 has a plurality of discrete slots 41 arranged in one quadrant of the disk and positioned in a continuous spiral pattern from a point approximately midway from the central shaft 21 to the periphery of the disk. The four light sources 33 labeled with the points of the compass may be seen below the disk 31, and the four photocells aligned with the light sources above the disk 30. The direct lines between the light sources 33 and their associated photocells 32 are parallel to the axis of the shafts 21 and 16 at a distance from the axis to register with the opening 40 in the disk 30 and the slots 41 of disk 31. The size of the direct path between the light sources 33 and the photocells 32 is preferably narrow in the direction of movement of the disks 30 and 31 to provide high resolution and broad in a radial direction to allow the disk 30 to vary the size of the light path. This may be accomplished by slotted masks 36 interposed in the light paths.

Figure 4:
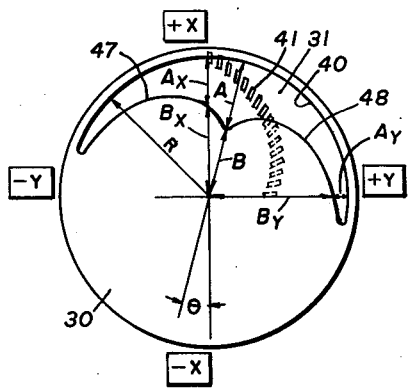
FIGS. 4 and 5 are schematic diagrams showing the positions of the two coding disks with two different wind directions.
Figure 5:
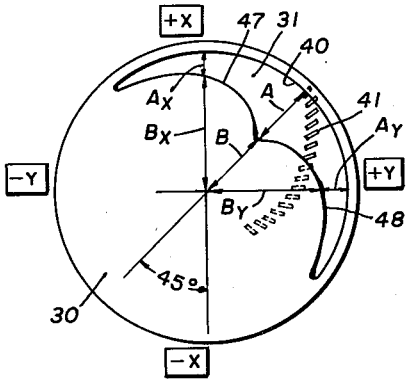

Referring now to FIGS. 4 and 5, two instantaneous positions of the disks 30 and 31 are shown in the presence of wind from two different directions. Shown at the top is a box labeled "+X" which represents the angular position of the "+X" photocell for producing current pulses indicative of the positive "X" component of wind speed and direction. The portion of window 40 in the region of the +X box has a radial dimension labeled as $A_x$ while the radial dimension of the maximum window opening is A. The outer boundary of the window 40, which is a semicircle, is at a distance R from the axis of the disk 30. $A_x$ is a function of the contour of the inner boundary section 47 of window 40. This boundary section 47 which determines the dimension $A_x$ is contoured in accordance with the formula $A_x = A \cos \theta$, where A is the maximum radial dimension of window 40 and $\theta$ is the angle of displacement of radius A with respect to the X axis. In the particular position of FIG. 4, this angle is 6°.

From the above equation for the section 47 of the window 40, it may be seen that the radial dimension $A_x$ varies with the cosine of $\theta$. The boundary section 47 of the opening is contiguous with the boundary section 48, which is the mirror image of the boundary section 47. The radial dimension of the window 40 in the boundary section 48 is a function of $A \sin \theta$. From FIG. 4 it will be apparent that both the photocells +X and +Y will be energized with the disk 30 in the position shown and disk 31 rotating. The number of pulses which reach either photocell is a function of both the speed of rotation of the disk 31, e.g., wind velocity, and the orientation of the disk 30, e.g., wind direction. In the position shown, with disk 30 displaced 6° with respect to the X axis, photocell +X may receive 99 pulses of light in a sampling period, while the photocell +Y receives 10 pulses of light during the same period. Neither the —X nor the —Y photocell will be energized, since light is blocked therefrom by the imperforate portion of the disk 30.

In FIG. 5, the disk 30 is displaced 45° with respect to the X axis. In this arrangement, where the dimensions $A_x$ and $A_y$ opposite the +X and the +Y photocells respectively are equal, that is, where both the sine and cosine are equal, both +X and +Y photocells receive the same number of pulses of light. In the particular case with the same wind velocity as in FIG. 4, the +X and +Y photocells both receive 71 pulses of light during the same sampling period.

The total number of pulses of light which are received by the photocells of this assembly is a function of the wind velocity as represented by the speed of disk 31 and the orientation of disk 30, while the distribution of these pulses between the four photocells is a function of the position of disk 30 as determined by the wind direction. The distribution of the pulses between any two energized photocells is a function of the vector components of the wind along the two axes represented by the photocells. This invention, therefore, not only registers the information supplied by the rotating members of the anemometer and wind vane, but resolves the input information into the X and Y components while converting it to digital form. These results are achieved since the system is one employing two inputs, one in analog form as represented by the continuous inner boundary of the window 40 in the disk 30, and the other in analog form as represented by the speed of disk 31, and digital as provided by the discrete openings in the disk 31 rotated by the anemometer. These two disks are arranged to limit the quantity of light from the four light sources to the four photocells and to distribute it to the four photocells in quantized form in accordance with the analog information determined by the position of the window 40 in disk 30 and the speed of disk 31. These multiple functions provided by a small number of components replace a comparatively complex electromechanical system employed heretofore.

Figure 3:
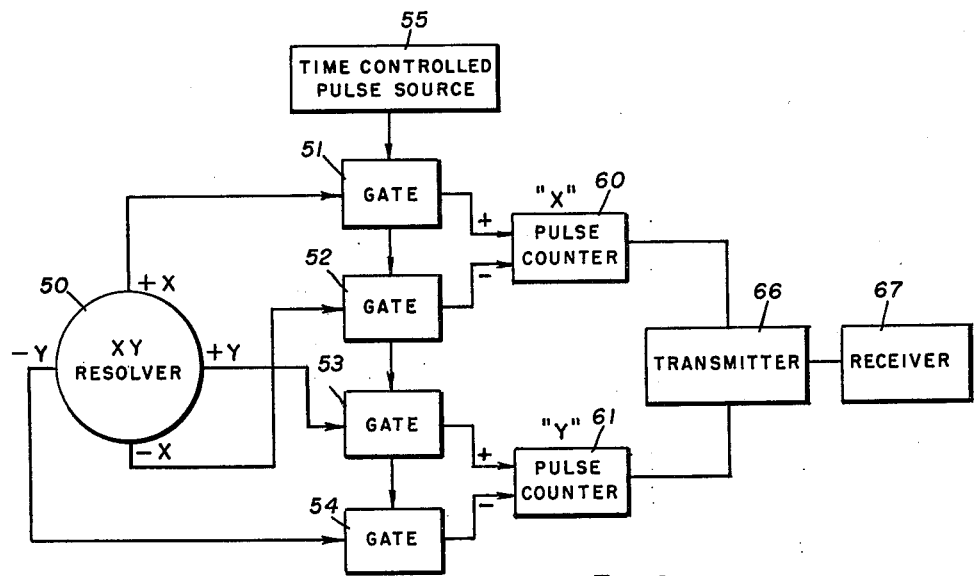
FIG. 3 is a block diagram of a telemetering system employing this invention.

A typical system employing the apparatus described is shown in FIG. 3. The anemometer, vane and electro-optical system is identified as the XY resolver 50. The four output leads from the resolver 50 labeled respectively +X, —X, +Y and —Y, carry the outputs from the respective photocells. Each of these output leads constitutes an information input lead to individual gates 51 through 54. The gates 51 through 54 may typically be unidirectional diode gates of the type shown in FIG. 14–2 on page 430 of Millman and Taub, "Pulse and Digital Circuits," copyright 1956, with the time-control pulse source 55 connected to the gate or control input lead and the XY resolver 50 connected to the "signal input" lead of the disclosed diode gate.

Transistor or other conventional gating circuits may also be used for gates 51 through 54 as well as a conventional relay with the time-control pulse source 55 connected to the operating winding of individual relays (gates 51 through 54) to control the conduction through a pair of relay contacts, one of which is connected to a respective X or Y lead on resolver 50 and the opposite contact constituting the output connection of the relay to the pulse counter 60 or 61. These gates 51 through 54 are all controlled by single time-controlled pulse source 55 which opens the information gates for a sampling period which may, for example, be one second, and then closes the gate to terminate the registration of information. The gates 51 and 52 associated with the +X and —X outputs of the XY resolver 50 are connected to introduce information into X pulse counter 60. The counter 60 derives the algebraic sum of the values of +X and —X photocell leads during the sampling period. In the example shown in FIG. 4, the input on the +X lead during the sampling period would be 71 pulses while the input on the —X lead would be zero pulses. The counter 60, therefore, would register a count of 71. If during the sampling period the wind direction changed markedly so that the —X photocell would be energized, the counter 60 would have inputs on both the +X and the —X leads and would register the algebraic sum of the positive and negative X values. Similarly, the +Y and —Y outputs of the XY resolver 50 are connected through respective gates 53 and 54 to the Y pulse counter 61. The counter 61 operates in the same manner to sum the +Y and —Y inputs. The registration of information in the counters 60 and 61 may be in the form of binary coded decimal digits or simple decimal digits, as may be desired. A suitable counting circuit for use as the X and Y pulse counters 60 and 61 is disclosed in Millman and Taub, "Pulse and Digital Circuits," copyright 1956, on page 335, describing a "Reversible Binary Counter." An electromechanical equivalent counter which might equally well be used is the well known telephone stepping switch. The counters 60 and 61 each have an output lead connected to a transmitter 66 arranged to transmit the information from the counters 60 and 61 after the conclusion of the sampling period. Responding to the transmitter in the system is a receiver 67 which may include a recorder for the velocity component information derived from the XY resolver 50.

The transmission system made up of transmitter 66 and receiver 67 may employ any of the well known modes of transmission ranging from simply two pair of copper conductors, one pair transmitting the X pulse counter output and the other pair the Y counter output, to such elaborate systems as employing FM-FM telemetry or pulse code modulation. The function of the transmission system is purely to transmit to a more convenient location for display the two trains of pulses, one denoting the X component of velocity and the other denoting the Y component of velocity. This information may be carried simply as two groups of pulses transmitted simultaneously or in time sequence, as may be desired. The receiver may typically include a pair of simple counters or registers to record or display the number of pulses received on the X and on the Y channels.

In the embodiment shown in the drawing, the anemometer and wind vane are illustrated as having coaxial driven shafts, and the two disks rotate about a common axis. It is recognized that the two disks need only be positioned for series interruption of a path of light between the light sources and the photocells and need not have a common axis, as shown. Therefore, the same concept underlying this invention may be employed in wind velocity and direction metering equipment having the two forms of information generated on noncoaxial shafts. A typical example of such equipment includes a horizontal axis propeller for generating wind velocity information mounted on a vane which is rotatable about a vertical axis. A simple optical system including a 45° oriented mirror is sufficient to provide a continuous light path in such apparatus between light sources and the photocells in order to generate the same type of digitally coded information as is produced in the coaxial shaft embodiment of FIG. 2.

Although for the purpose of explaining the invention a particular embodiment thereof has been shown and described, obvious modifications will occur to a person skilled in the art, and I do not desire to be limited to the exact details shown and described.

I claim:

1. Apparatus for deriving from a vector quantity a signal corresponding to the magnitude of a component of the quantity in a selected direction comprising: a first rotary screen; means for rotating the screen at a speed proportional to the magnitude of the vector quantity; a second rotary screen; means for rotatably positioning the second screen with respect to the selected direction according to the angle of the vector quantity; the first screen having a plurality of apertures extending generally in the direction of rotation of the screen but progressively displaced from a base circle of rotation in the first screen whereby during rotation of the first screen the number of apertures passing the reference position is proportional to the magnitude of the vector quantity, the second screen having a window having a beam-cutting edge at variable distance from the base circle as a function of the angle of the vector quantity with respect to the selected direction; means for transmitting a beam of light through apertures in the first screen and the window of the second screen in the selected direction; and means responsive to the number of light pulses passing through the first and second screens for generating an electrical signal indicative of the component of the vector quantity in the selected direction.

2. The combination in accordance with claim 1 including means for restricting the beam of light in the direction of rotation of the first screen whereby the means responsive to light pulses is energized by pulses passing through the apertures in the first screen only as the apertures are positioned in the selected direction.

3. The combination in accordance with claim 1 including means for transmitting individual beams of light along four selected directions in quadrature with respect to the axis of rotation of the second screen and individual means responsive to light pulses passing through the first and second screens along four respective selected directions for generating electrical signals indicative of the components of the vector quantity in the respective selected directions.

4. The combination in accordance with claim 3 wherein the window in the second screen extends through two quadrants and no more than two of the individual light-responsive means are simultaneously energized indicative of the components of the vector quantity in the two selected directions.

5. Apparatus for deriving from a vector quantity a signal corresponding to the magnitude of the component of said quantity in a fixed direction comprising: a first rotary screen and means for rotating it at a speed proportional to the magnitude of said vector quantity; a second rotary screen and means for rotatably positioning it with respect to a reference position according to the angle of said vector quantity; photoresponsive means; means for transmitting a beam of light through a fixed path to said photoresponsive means; said fixed path intersecting both said screens at said reference position; said path being narrow in the direction of rotation of said screens and wide in direction perpendicular to said direction of rotation; said first screen having a row of apertures extending generally in the direction of rotation but progressively displaced from a base circle of rotation in said screen whereby rotation of said row of apertures across said path progressively passes light pulses through different portions of said path progressively spaced from said base circle; said second screen having a window extending through one quadrant and having a beam-cutting edge variably spaced from said base circle to variably block said light path in different positions of said window such that light passed by successive apertures in said first screen is progressively blocked in response to movement of said window away from centered position with respect to said light beam; and means responsive to the number of light pulses reaching said photoresponsive means during a fixed interval of time for generating a signal indicative thereof.

6. A vector resolver comprising: a source of angular information; a source of velocity information; a first screen coupled to the source of angular information for angular displacement proportional to the angular information input; a second screen coupled to the source of velocity information for rotation at a rate proportional to the magnitude of the velocity information; the first screen having a light passage therethrough with a first boundary region determined in accordance with the formula $L=A \cos \theta$ and a second boundary region in accordance with the formula $L=A \sin \theta$ where L is the radial width of the light passage, A is a constant, and $\theta$ is the angle between a reference line and the radius along which the width L is measured; the second screen having a plurality of discrete light passages therethrough spaced at incremental distances from the axis of the second screen and around one quadrant of the screen; a plurality of light sources positioned in quadrature for emitting light to the aligned light passages in the first and second screen; a plurality of photoresponsive elements positioned on the opposite side of the light passages from the light sources; and means for registering the number of light pulses reaching any pair of photoresponsive elements; which number is indicative of the velocity components along the two axes represented by the two photoresponsive elements.

7. A rotational analog-to-digital converter comprising: a first shaft source of analog rotational speed information; a second shaft source of analog angular orientation information; a disk coupled to the first shaft including a plurality of discrete light passages arranged in quadrature; a disk coupled to the second shaft including a light passage of variable radial length in two adjacent quadrants of the disk; the radial length of the light passage in the second disk being a function of the angle of orientation of the second disk with respect to a reference axis; a plurality of light sources arranged in quadrature for transmitting light through aligned apertures in first and second disks; a plurality of photoresponsive elements positioned in quadrature for receiving light pulses transmitted through the first and second disks from the light source; and means for registering the number of light pulses received by any pair of photoresponsive elements, the number and distribution of light pulses between the pair of photoresponsive elements being a function of the vector rotational speed and angular orientation quantity.

8. A rotational analog-to-digital converter comprising: a first shaft of analog rotational speed information; a second shaft source of analog angular orientation information; a first screen coupled to the first shaft including a plurality of discrete light passages arranged in one quadrant of the screen at variable radial distances from the axis of the screen; a second screen coupled to the second shaft including a single continuous light passage in two adjacent quadrants of the screen; the radial length of the light passage in the second screen being a function of the angle of orientation of the second screen with respect to a reference axis; four light sources arranged in quadrature on one side of the first screen; four photoresponsive elements aligned with respective light sources for registering the number of light pulses passing through the first and second screens from the light source; and means for registering the number of light pulses reaching any pair of photoresponsive elements, the number and distribution of light pulses between the two photoresponsive elements of a pair being a function of the vector components of the speed and angular orientation quantities.

9. Wind speed and direction metering apparatus comprising: an anemometer; a wind vane; a first screen coupled to rotate with the anemometer; a second screen coupled to rotate with the wind vane; the first screen including a series of discrete openings arranged at different radial distances from the axis of the screen; the second screen having an opening of radial length varying as a function of the angle of displacement of the screen; a plurality of light sources positioned to introduce light through the openings in the first and second screens; and respective photoresponsive means positioned for reception of light pulses transmitted through the first and second screens from the plurality of light sources, the number of light pulses and the distribution among the photoresponsive means being a function of wind speed and direction.

10. Wind speed and direction metering apparatus comprising: an anemometer; a wind vane; a first screen coupled to rotate with the anemometer; a second screen coupled to be displaced by the wind vane; the first screen including a series of discrete openings extending at varying radial distances from the axis of the first screen; the second screen having an opening of continuously varying radial length through a portion of the screen; a plurality of light sources positioned to introduce light through the openings in the disks in sequence; and respective photoresponsive means responsive to light pulses transmitted through the series of light screens, the number of light pulses and distribution among the photoresponsive means being a function of the wind speed and direction.

11. Wind speed and direction metering apparatus comprising: an anemometer; a wind vane; a first screen coupled to rotate with the anemometer; a second screen coupled to rotate with the wind vane; a first screen including a series of discrete openings in a quadrant arranged at varying radial distances from the axis of the screen; a second screen including an opening having a radial length in accordance with the equation, $d = A \cos \theta$, where $d$ is the radial length of the opening, A is a constant, and $\theta$ is the angle of displacement of the second disk with respect to a fixed reference; a light source positioned on one side of the screen for introducing light in sequence through the first and second screens; and a photoresponsive element positioned to be energized by light pulses transmitted through the series screens.

12. Wind speed and direction resolving apparatus comprising: an anemometer; a wind vane; a first screen coupled to rotate with the anemometer; a second screen coupled to rotate with the wind vane; the first screen including a series of discrete openings at varying radial distances from the axis of the first screen; a second screen including an opening of radial length which is a function of the angle of displacement of the second screen with respect to a fixed axis; a first light source positioned for introducing light through the openings in the screens in sequence; a first photoresponsive element positioned to receive light from the light source; a second light source positioned at a 90° interval about the axis of the second screen with respect to the first light source for introduction of light through the openings in the first and second screens; a second photoresponsive element positioned to receive light from the second light source; and means for registering the number of light pulses reaching the first and second photoresponsive means, the number of light pulses being a function of the components of the wind speed along the 90° spaced intervals.

13. Wind speed and direction resolving apparatus comprising: an anemometer; a wind vane; a first screen coupled to rotate with the anemometer; a second screen coupled to rotate with the wind vane; the first screen including a series of discrete openings arranged at varying radial distances in a quadrant of the screen, the second screen including an opening having a variable radial length in one quadrant in accordance with the formula $$d = A \cos \theta$$

and a second contour in accordance with the formula $d = A \sin \theta$ in adjacent quadrants where $d$ is the radial width of the opening, A is a constant, and $\theta$ is the angle between the reference axis and the radius along which the width $d$ is measured; a plurality of light sources positioned in quadrature for emitting light through aligned light passages in the first and second disks; a plurality of photoresponsive elements positioned on the opposite side of the light passages to receive light from respective light sources; and means for registering the number of pulses of light reaching any pair of photoresponsive elements indicative of the velocity components along the two axes represented by the two photoresponsive elements.

References Cited in the file of this patent

UNITED STATES PATENTS

| | | |
|---|---|---|
| 2,375,227 | Hillman | May 8, 1945 |
| 2,604,528 | Obermaier | July 22, 1952 |
| 2,623,389 | Oosterom | Dec. 30, 1952 |